ELECTRO-OPTICAL MEMORY MEANS AND APPARATUS

Filed April 19, 1967 4 Sheets-Sheet 1

INVENTOR
DONALD S. OLIVER
BY
David A. Rich
ATTORNEY

INVENTOR
DONALD S. OLIVER
BY
David A. Rich
ATTORNEY

INVENTOR
DONALD S. OLIVER

BY

David A. Rich
ATTORNEY

INVENTOR
DONALD S. OLIVER
BY
David A. Rich
ATTORNEY

United States Patent Office 3,543,248
Patented Nov. 24, 1970

3,543,248
ELECTRO-OPTICAL MEMORY MEANS AND APPARATUS

Donald S. Oliver, West Acton, Mass., assignor to Itek Corporation, Lexington, Mass., a corporation of Delaware Filed Apr. 19, 1967, Ser. No. 632,031
Int. Cl. G11c 13/04, 5/02; G02f 7/00
U.S. Cl. 340—173 15 Claims

ABSTRACT OF THE DISCLOSURE

An electroluminescent diode matrix is integrally formed between a plurality of row and column conductors together with a photoelectret layer exhibiting persistent internal polarization. Information is read in by applying an appropriate voltage between a selected row and column conductor to illuminate a discrete photoelectret region while a voltage is applied across the photoelectret. Information is read out by energizing a selected row-column junction and connecting the photoelectret to an output circuit. In one form of the device an image is projected onto the photoelectret and read out serially by energizing sequentially selected row-column conductor junctions.

The present invention relates to data bearing media and apparatus utilizing such media. More particularly, the invention relates to an electro-optical memory means and apparatus utilizing the memory means for data processing by receiving, storing and discharging signals in response to radiant energy.

More especially, the invention relates to an electro-optical medium utilizing the effect of persistent internal polarization. The electro-optical medium receives and stores a signal in response to electroluminescent energy while a field is applied therein.

In the prior art, a number of devices have been proposed, utilizing electroluminescence as an element of a data storage and processing device. For example, in Pat. No. 3,145,368, issued to C. W. Hoover, Jr. an electroluminescent storage and readout system is disclosed, using electroluminescence as provided by an alternating current supply. In that device, an information storage and readout system includes an electroluminescent matrix light source, an information storage plate, a light-sensitive device for receiving light from the electroluminescent matrix through the information storage plate, and a tuned circuit connecting to the light-sensitive device. Means are provided for applying distinct frequency input signals to the respective coordinate inputs of the electroluminescent matrix light source. The output tuned circuit is adjusted so as to distinguish the respective input signal frequencies from their sum or difference frequency.

Such a system contemplates the use of an alternating current signal to energize discrete electroluminescent junctions at the cross-overs of row and column conductors of an electroluminescent matrix panel. It may be used in the present invention in a matrix panel including persistent internal polarization elements. The data bearing medium and apparatus of the present invention is distinct from that of Hoover, in that the data are electrically stored and available for repetitive interrogation. Further, in the preferred mode of the invention, direct current is used to energize electroluminescent diodes to avoid the cross talk problems inherent in the Hoover system. A somewhat similar electroluminescent storage system is described and illustrated in Pat. No. 3,085,231, issued to S. L. Linder. Linder uses a phase-shifting network to enhance selectivity at cross-over points.

A memory device disclosed in Pat. No. 2,912,592, issued to Edward F. Mayer, uses a sandwich including a photoconductor imbedded in a transparent insulation between a pair of electrode panels, one of which is transparent. Although not expressly stated by Mayer, he employs material such as zinc sulphide, ZnS, zinc sulphide ZnS mixed with cadmium sulphide, CdS, zinc silicate, $ZnSiO_3$, and antimony trisulphide, $Sb_2S_3$, suggesting the use of an effect similar to persistent internal polarization. Mayer shows a matrix panel of row and column conductors with the photoconductive material in between as an alternate embodiment of his device. For writing or reading, Mayer uses a cathode ray tube which scans sequentially the memory device with a moving spot of light. In contrast, the present invention utilizes discrete light sources, which are in fixed spatial relation to the memory means of the instant device.

A light producing and memory means is described and illustrated in Pat. No. 3,235,850, issued to H. P. Kallman et al. Kallman uses bits of electroluminescent material suspended in dielectric material, which he characterizes as exhibiting the property of persistent internal polarization. The dielectric material he cites by way of example, is castor wax or tricresyl phosphate. Neither of these materials is known to be photoconductive. It is, therefore, not understood how Kallman obtains persistent internal polarization. In contrast, the present invention contemplates the use of a light source which provides discrete radiant energy for irradiating the memory means with the discrete energy and the memory means being in fixed spatial relation.

Prior art devices of the character described are not capable of receiving and storing an optical image in combination with means for serially reading out the stored data in bits.

For use as memory means, such prior art devices are limited in storage density.

Scan conversion systems in the prior art involve complex structures utilizing, for example, cathode ray tubes and are relatively expensive. Further, such systems are relatively large, require high voltage operation and cannot be fabricated by integrated circuit techniques. In general, they are not compatible with solid state, flat screen display systems.

Other devices which exhibit similar disadvantages include flicker free display, redundant facsimile transmission and bandwidth compression systems. Typical display systems are not adapted for random input. In the past, displays cannot be updated without clearing the entire display. Prior art facsimile systems are not capable of repetitive readout without destroying the data. Vacuum tube facsimile systems do not exhibit spatial stability and digital addressing, enabling a given element to be sampled in successive scans. Instabilities in the power supplies circuitry and deflection coils inhibit the ability to resample a given element repetitively using, for example, a continually moving electron beam or light source. In bandwidth compression, the maximum transmission rate of information through a communication channel is limited by the bandwith of the channel. Known facsimile systems characteristically sample an element at a time. It is desirable to increase the scanning rate during the period that no information is present.

It is therefore an object of the invention to provide an improved data bearing medium for storing information.

A further object of the invention is to provide an improved memory means which may be repetitively interrogated without degrading the information.

Yet another object of the invention is to provide an improved data bearing medium in a matrix having a greater data storage density.

A still further object of the invention is to provide an improved data bearing medium for receiving, storing and converting into electrical signals an optical image.

Another object of the invention is to provide an improved electroluminescent data storage and readout system.

Still another object of the invention is to provide an improved data bearing medium and apparatus capable of receiving data in parallel and reading out in series.

A still further object of the invention is to provide an improved solid state, scan converter, which is relatively small, is compatible with flat screen display systems, utilizes low voltages and can be fabricated by integrated circuit techniques.

Yet another object of the invention is to provide an improved solid state, flicker free display system capable of clearing and changing a single display element at a time, at a relatively high rate.

Still another object of the invention is to provide an improved solid state, redundant facsimile transmission system capable of repetitively in rapid succession reading out a given data bit.

A still further object of the invention is to provide an improved solid state, bandwidth compressor capable of effectively increasing the transmission rate of information through a communication channel.

In accordance with the invention there is provided a data bearing medium. The medium includes memory means for receiving and storing a signal in response to radiant energy while a field is applied therein. The memory means retains the signal when the radiation and the field is removed and discharges a signal when radiant energy is re-applied after a time interval. Radiant energy means are provided and include means providing discrete radiant energy for irradiating the memory means. The discrete energy and the memory means are in fixed spatial relation. Field means provide a field in the memory means. Energy control means control the application of the radiant energy to the memory means. Field control means control the application of the field to the memory means.

In one form of the invention, energy control means include readout means for successively applying discrete pulses of radiant energy to the memory means for successively reading out the signal.

In another form of the invention, the readout means include means for applying the pulses in rapid succession for rapidly reading out the signal to achieve a high information rate.

In yet another form of the invention, the memory means is an electret exhibiting persistent internal polarization and the field is an electric field. The electret has two stable signal states; one for storing a signal after removal of the radiant energy, and the other for storing a signal after the electret is short circuited. Short circuit means are provided for short circuiting the electret after the radiant energy is removed.

In still another form of the invention, the radiant energy includes light provided by electroluminescent material coupled in fixed relation and close proximity to the memory means.

In yet another form of the invention, the radiant energy means includes an electroluminescent matrix panel having a plurality of transversely oriented row and column conductors. The cross-overs between the conductors provide discrete light signals. The electrets are formed in a panel with each discrete electret region corresponding with one of the discrete light signals.

In still another form of the invention, the electret panel is in the form of a sandwich with the electret material sandwiched between a pair of transparent conductive panels. An opaque mask may be interposed between the electroluminescent panel and the electret panel. The mask has transparent areas corresponding with the discrete light signals.

In still another form of the invention, the electret panel is adapted to receive an optical image while the electric field is applied to the transparent conductors. The optical image is serially read out after the field is removed. Means are provided for scanning the row and column conductors in a predetermined manner to read out the image. Image means are provided for projecting an optical image on one of the transparent conductive panels. The other transparent conductive panel is juxtaposed with the electroluminescent panel to receive the discrete light signals.

In still another form of the invention, a second electroluminescent panel matrix is disposed in juxtaposition with the electret panel. The second matrix has a plurality of transparent conductors forming a second common conductive layer between the electret panel and the second electroluminescent panel. The second electroluminescent panel is sandwiched between the second common conductive layer and a third conductive layer having a plurality of conductors transversely oriented relative to the conductors of the second common conductive layer. The cross-overs between the second and third conductive layers provide discrete light signals in response to output electrical addressing signals to enable discrete photoelectret regions.

The invention may be adapted for use as a scan converter. Input scan generator means are coupled to the first electroluminescent panel matrix. Output scan generator means are coupled to the second electroluminescent panel matrix. Switching means are coupled to the electret for coupling the electret to a source of input signal to operate the input scan generator means and to a source of output signal to operate the output scan generator means.

The invention may be adapted for use as a flicker free display. Input address register means are coupled to the first electroluminescent panel matrix. Output raster generator means are coupled to the second electroluminescent panel matrix. Switching means are coupled to the electret for coupled the electret to a source of input signals to operate the input register means and to an output terminal to operate the output raster generator means. A light emitting display panel emits light characters at discrete locations in a matrix in response to output signals from the output terminal. Electronic switching means are coupled to the output terminal, the display panel and the output raster generator means. The switching means thereby couples output signals to the discrete locations of the display panel as determined by the output raster generator means.

The invention contemplates an unique electroluminescent diode photoelectret. It includes a conductive layer and a layer of electroluminescent material having a rectifying junction. A common transparent conductive layer is provided. The electroluminescent material is disposed between the first conductive layer and the transparent conductive layer and integrally formed therewith. A layer of photoelectret material is in intimate contact with the transparent conductive layer opposite the electroluminescent material. A third conductive layer is provided. The photoelectret material is sandwiched between the transparent and the third conductive layer. All of the layers are integrally coupled together.

The invention further contemplates an electroluminescent diode photoelectret panel matrix. The matrix includes a first conductive layer having a plurality of conductors and a second, common conductive layer having a plurality of transparent conductors transversely oriented relative to said first layer conductors. A layer of electroluminescent material having a rectifying junction is disposed between the first and second conductive layers. A layer of photoelectret material is disposed between the second and third conductive layers.

The matrix may be further adapted to provide symmetrical input and output light signals from the opposite sides of the photoelectret layer by adding a second layer of electroluminescent material having a rectifying junction. The second electroluminescent layer is disposed between the third conductive layer and a fourth conductive layer.

Other and further objects of the invention will be apparent from the following description of the invention, taken in connection with the accompanying drawings, and its scope will be pointed out in the appended claims.

PRINCIPLES OF OPERATION

Figure 1:
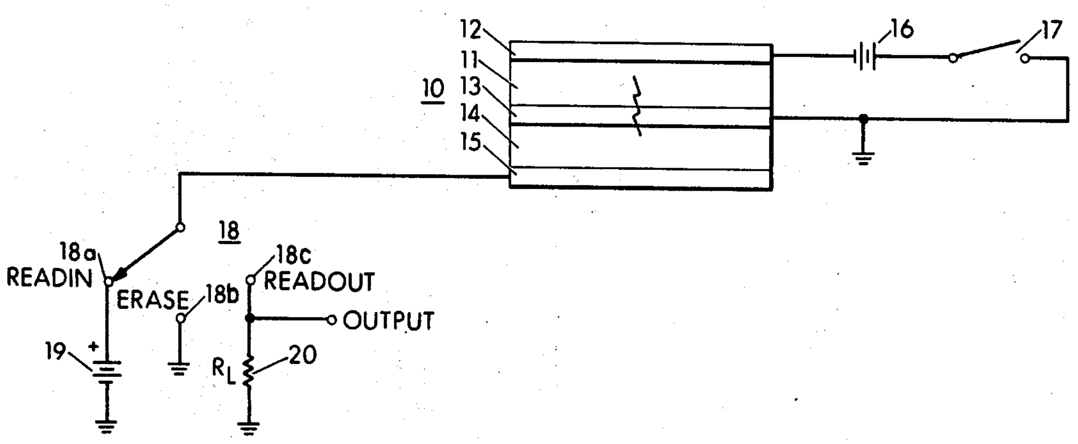
FIG. 1 is a schematic diagram of a data bearing medium embodying the invention.

The term "photoelectret" as used herein includes, but is not limited to, devices which exhibit the phenomenon of persistent internal polarization in conjunction with the presence and removal of enabling light energy. The terms "optical" and "light" as used herein, include, but are not limited to, light energy ranging in frequency from infrared through ultraviolet. The term "layer" as used herein, includes, but is not limited to, a layer of a plurality of distinct elements. The term "conductive layer" as used herein, includes, but is not limited to, a layer of a plurality of distinct conductors.

A photoelectret is typically composed of a photoconductive material such as zinc sulphide held in suspension with a binding material that is an insulator having an extremely high dielectric constant. When a voltage is applied across the photoelectret in the presence of enabling radiation, such as light, the material becomes internally electrostatically polarized. When the light is removed and the voltage across the electret is short circuited, it retains its internal polarization. When the short circuit is removed, with no voltage across the photoelectret, and upon the application of a pulse of light, the photoelectret discharges a signal. In contrast with conventional photoconductors which tend to remain photoconductive after the light source is removed, the photoelectret of the present invention is photoconductive substantially only when the enabling light energy is present, and not otherwise. Further, the time required for the photoelectret of the present invention to become photoconductive is considerably less than a microsecond. Thus, given a voltage across the electret and an enabling pulse of light energy of less than a microsecond, the electret becomes polarized. This implies an extremely high readin information rate. Readout takes place rapidly in the presence, for example, of a pulse of readout light energy of a microsecond or less. Further, the electret retains its polarization indefinitely and may be successively, rapidly interrogated to provide non-destructive readout information.

The electret may be erased by short circuiting it in the presence of readout light energy directed at the photoconductive material. Given an input signal of one polarity by reversing the voltage polarity across the electret in the presence of light, the internal polarization may be reversed within a short period of time, for example, less than a microsecond.

This implies several stable states associated with the electret. A zero condition exists when the electret is unpolarized; it, therefore, discharges no signal in the presence of readout light energy. On the application of an initial polarizing positive voltage in the presence of light, the electret effectively has a charge equal to the full applied voltage. When the light is removed and electret is short circuited, it retains an internal charge of a positive voltage less than the applied voltage. When the polarity of the polarized voltage is reversed in the presence of enabling light energy, the electret is negatively charged to the full applied voltage. After the light is again removed and it is then short circuited, it retains a less internal negative charge. There are thus five stable voltage states associated with the electret for various operating conditions at a given bias voltage: high positive, low positive, zero, high negative, and low negative.

The use of electroluminescent material in close proximity with the electret provides a new basic photoelectric element which is extremely flexible and useful for a large number of applications. A gallium arsenide electroluminescent diode, for example Model No. 4107 as manufactured by H. P. Associates, Palo Alto, Calif., radiates a narrow band of infrared light at 9,000 angstrom units at an exceedingly high intensity. Such a diode has a very fast rise time associated with it, for example, 100 nanoseconds, and can be formed in a panel of solid state material integrally with a photoelectret panel. By introducing row and column conductors and a transparent conductive layer for the electret panel exposed to the diode matrix, one attains a unitary electroluminescent diode photoelectret panel matrix. The diode matrix thus obtained substantially eliminates crosstalk from one junction to another, i.e. from one cross-over to another. A given row conductor and column conductor are selected which produce a light burst at the cross-arm of the conductors to irradiate the photoelectret at a discrete location with the readin or readout light energy required. While an alternating current matrix may be used with the photoelectret of the invention, such a system becomes extremely complex as exemplified, for example, by the patent to Hoover noted above.

A solid state electroluminescent diode panel matrix has many advantages over the alternating current type. In contrast with the alternating current electroluminescent panel, a solid state diode electroluminescent panel preserves its light output indefinitely and provides peak light output intensity in a very short time interval.

DESCRIPTION AND EXPLANATION OF THE DATA BEARING MEDIUM IN FIG. 1

Referring now to the drawings and with particular reference to FIG. 1, there is here illustrated an electroluminescent diode photoelectret and associated circuitry. The photoelectret is generally indicated at 10. A solid state diode 11 is shown sandwiched between a conductor 12 and a transparent conductor 13 to a photoconductor 14, sandwiched between the conductor 13 and a conductor 15. The transparent conductor 13 represents a common transparent electrode for the electroluminescent diode and the photoelectret. The photoelectret generally comprises the photoconductor 14, the conductor 13 and the conductor 15; the electroluminescent diode comprises the solid state diode 11, a conductor 12 and the transparent common conductor 13. The conductor 13 is connected to ground as shown. The conductor 12 is connected to a source of direct current supply 16 and through a switch 17 to ground. The conductor 15 is connected through a three position switch 18, having a readin contact **18*a*, an erase contact 18*b*, and a readout contact 18*c*. The readin contact 18*a* is connected through a battery 19 to ground. The erase contact 18*b* is grounded and the readout contact 18*c* is connected through a load resistance 20** labelled $R_L$.

OPERATION

With the switch 18 in the readin position, as shown, a positive voltage is applied from the battery 19 to the conductor 15 which appears across the photoconductor 14. When the switch 17 is closed, the electroluminescent diode is energized and light is transmitted through the transparent conductor 13 to the photoconductor 14 and enables internal polarization. The switch 17 is then opened.

With the switch 18 in the position **18*b* labelled ERASE, and the switch 17 open, the photoelectret is short circuited. The signal stored in the photoelectret may now be retained. If erasure is desired, the electret remains short-circuited and the switch 17 is closed to provide enabling light energy directed to photoconductor 14 to depolarize the electret. While the switch 18 is in the position 18*b*, the erase cycle is only exercised as desired by closing the switch 17. If erasure is not desired, the switch 18 is taken from the position 18*a* to the position 18*b* and then to the readout position 18*c* without applying the light energy to the photoelectret at the position 18*b***.

When the switch 18 is in the position **18*c* for readout, no signal appears across the load resistor 20 unless the switch 17 is closed and enabling light energy from the electroluminescent diode is directed to the photoconductor 14. As such time as the switch 17 is closed, the photoelectret discharges across the load resistor 20** and produces an output signal.

DESCRIPTION AND EXPLANATION OF THE PANEL MATRIX IN FIG. 2

Figure 2:
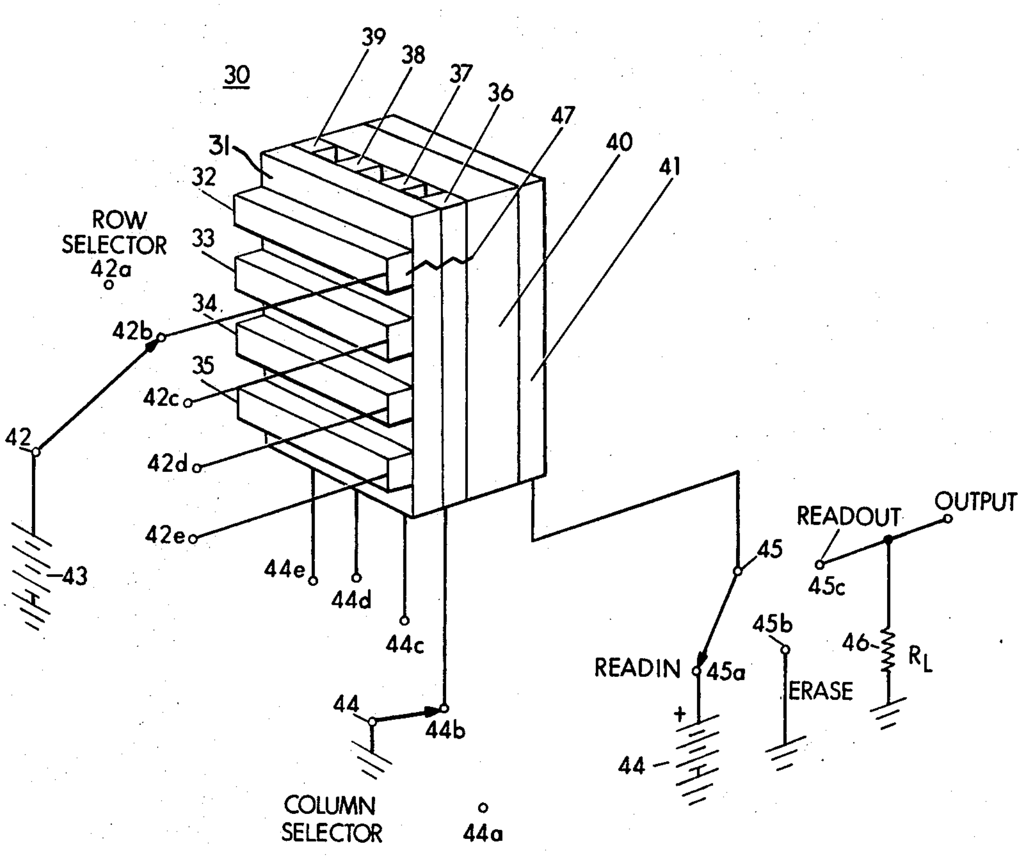
FIG. 2 is a schematic diagram of a memory system embodying the invention.

Referring now to FIG. 2, there is here illustrated a memory system utilizing an electroluminescent diode photoelectret panel matrix embodying the invention. Here the electroluminescent diodes and photoelectrets are integrally formed together into a single unit having a common transparent conductive array at the interface between the photoconductive material and the electroluminescent material. The electroluminescent material has a rectifying junction and is formed in a panel disposed between a plurality of row conductors and transparent column conductors. As shown here the row and column conductors are transversely oriented to provide cross-overs and define thereby discrete light producing regions. Each cross-over establishes an element in the matrix corresponding with a discrete photoelectret region.

The electroluminescent diode photoelectret panel matrix is generally indicated at 30. An electroluminescent panel 31 is disposed between a plurality of row conductors 32, 33, 34 and 35 and a plurality of column conductors 36, 37, 38 and 39. The number of conductors shown is purely arbitrary and is chosen to correspond with a data storage requirement. A photoconductor panel 40 is disposed between the column conductors and a conductive layer 41 to provide the photoelectret. The row conductors are coupled to contacts of a row selector switch 42. The conductors 32, 33, 34 and 35 are coupled to contacts **42*b*, 42*c*, 42*d* and 42*e* respectively. The switch 42 is coupled to a battery 43** to supply the voltage required for the electroluminescent panel matrix. The column conductors are transparent to propagate light, when a particular cross-over is energized, to the corresponding discrete photoelectret region.

The column conductors are coupled to the contacts of a switch 44 having contacts **44*b*, 44*c*, 44*d* and 44*e* coupled to conductors 36, 37, 38 and 39, respectively. The conductor 41 is coupled to a switch 45 having three contacts 45*a*, 45*b* and 45*c* corresponding to the readin, erase and readout positions respectively. The contact 45*a* is coupled to a battery 44 to provide a voltage source for the photoelectret. The contact 45*b* is grounded and the contact 45*c* is coupled to an output load resistor 46** labelled $R_L$.

OPERATION

When the switch 42 is in the position **42*a* and the switch 44 is in the position 44*a*, the switch 45 may be in any position and neither readin nor readout takes place. For readin the switch 45 is in the position shown coupled to the contact 45*a* to the source of positive voltage, provided by the battery 44, to the conductor 41. For the row and column selector switches 42 and 44 in the position shown, the electroluminescent panel is energized at the cross-over between the row conductor 32 and the column conductor 36. Light energy indicated by the wavy line 47 emanates from the cross-over through the transparent conductor 36 into the photoconductor 40 at a discrete photoelectret region. The ground provided by the switch 44 to the conductor 36 is a common ground for the photoelectret. The switch 45 couples the positive voltage from the battery 44 to the conductor 41 to provide a field in the electret. The four by four matrix shown provides a total of sixteen cross-overs corresponding with sixteen discrete photoelectret regions. Any one of the sixteen cross-over points may be chosen by appropriately adjusting the position of the selector switches 42 and 44**. Thus, the memory system has random access both for input and output.

For erasure of a given information bit stored in a discrete photoelectric region, the switch 45 is placed in the erase position corresponding with contact **45*b*. For the sake of clarity, the memory system is shown in its simplest form. The system may be readily modified to provide a switching function connecting the row conductors together to the battery 43 and the column conductors together to ground at the same time that the switch 45** is in the erase position, thereby erasing all characters simultaneously.

With the switch 45 in the readout position coupled to the contact **45*c*, any of the sixteen information bits stored in the photoelectret may be interrogated again by adjusting the selector switches 42 and 44** to the desired matrix element.

By making the conductive layer 41 transparent, an optical image may be projected onto the photoelectret while the switch 45 is in the readin position. The selector switches 42 would then be in position **42*a*. The selector switch 44 would be modified to ground all the column conductors. It may be desirable for some purposes to superimpose the electroluminescent signals on the image thus obtained. In effect the image is converted from analog to digital form by reading out the information using the selector switches 42 and 44 to scan, e.g., each row column by column. With the selector switch 45 in the readout position, each information bit appears serially across the output load resistor 46**.

DESCRIPTION AND EXPLANATION OF THE IMAGE STORAGE SYSTEM IN FIG. 3

Figure 3:
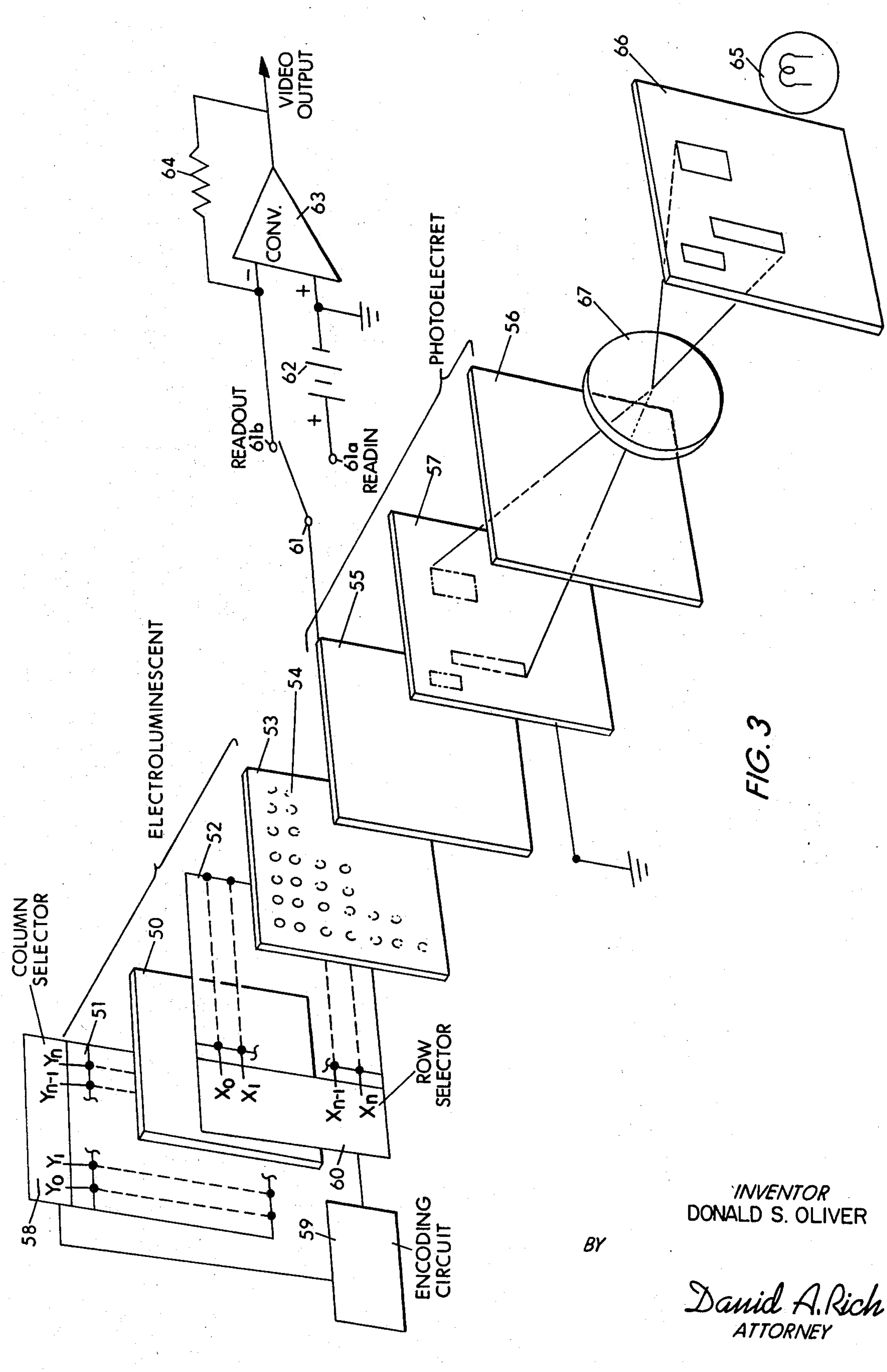
FIG. 3 is a schematic diagram of an image storing and readout system embodying the invention.

Referring now to FIG. 3, there is here illustrated an image storage system embodying the invention. Here an electroluminescent diode matrix panel is coupled to a photoelectret panel sandwiched between a pair of transparent conductors. An image is projected through one conductor of the photoelectret and readout through the other conductor of the photoelectret. The system as shown is an exploded view. The structure of the electroluminescent diode photoelectret panel matrix is unitary and coupled together as described above.

An electroluminescent diode matrix panel 50 is disposed between a plurality of column conductors 51 and a plurality of row conductors 52. The column conductors are labelled $Y_0, Y_1 \ldots Y_n$ and the row conductors are labelled $X_0, X_1 \ldots X_n$ indicating that the number of cross-overs providing the electroluminescent matrix element is arbitrary and chosen to meet a given requirement. A mask 53 is interposed between the electroluminescent panel matrix and the photoelectret. The mask is opaque except for openings 54, each corresponding with a cross-over or matrix element of the element of the electroluminescent panel matrix and with a discrete photoelectret region. The photoelectret includes a pair of transparent conductive layers 55 and 56 with a layer of photoconductive material 57 disposed between them.

The column conductors 51 are coupled to a column selector cilcuit 58 which in turn is coupled to an encoding circuit 59. The encoder 59 is coupled to a row selector 60 which in turn is coupled to the row conductors 52. The photoelectret conductor 56 is grounded and the conductor 55 is coupled to a mode selection switch 61 having contacts 61*a* and 61*b* corresponding with readin and readout respectively. The contact 61*a* is coupled through a battery 62 to a glound and the contact 61*b* is coupled to an operational amplifier 63 having a feedback resistor 64. A light source 65 is projected to an image 66 to be transmitted through the conductor 56 and appear on the photoconductor 57 in the positions shown.

When the switch 61 is in the readin position, a positive voltage is applied to the conductor 55 applying a field through the photoconductor 57. A light image is projected through the lens 67 and the conductor 56 to the photoconductor 57. The stored voltage for a discrete electret region is a function of the intensity of the light incident upon the region. It is thus possible to store an image varying in light intensity in an analog fashion in the photoconductor 57. When the switch 61 is in the readout position, the encoding circuit 59 addresses the column selector 58 and the row selector 60 to scan the photoelectret element by element. The resultant serial signals are coupled from the conductor 55 to the amplifier 63 to provide a video output.

DESCRIPTION AND EXPLANATION OF THE DUAL CONTROL STORAGE SYSTEM IN FIG. 4

Figure 4:
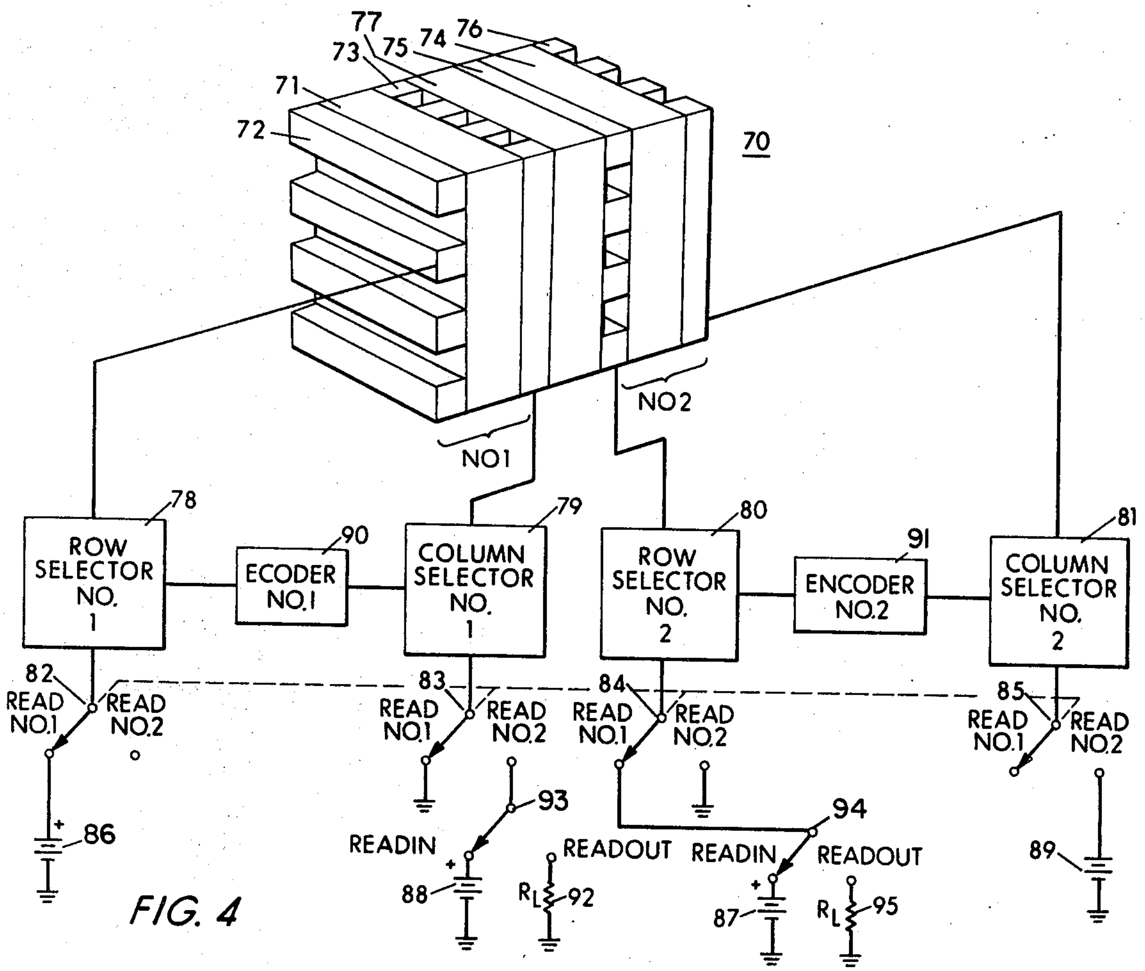
FIG. 4 is a schematic diagram of a dual control data processing system embodying the invention.

Referring now to FIG. 4, there is here illustrated a dual control storage system embodying the invention. It will be apparent from FIG. 3 that a photoelectret having a photoconductor sandwiched between a pair of transparent conductive layers can be enabled by light energy from either direction. Clearly, the electroluminescent panel matrix as shown in FIG. 3 may be coupled to either side of the photoelectret in FIG. 3 to provide a symmetrical, dual control storage device. Such a system is clear and does not require further illustration or description here.

The storage system in FIG. 4 utilizes an integral unitary structure having a photoelectret sandwiched between a pair of electroluminescent matrices. Either matrix may be utilized for either readin or readout.

The dual control electroluminescent diode photoelectret panel matrix is generally indicated at 70. Matrix No. 1 has an electroluminescent panel 71 coupled between a plurality of row conductors 72 and a plurality of column conductors 73. Matrix No. 2 has an electroluminescent panel 74 coupled between a plurality of row conductors 75 and column conductors 76. The photo-electret comprises the column conductors 73, a photoconductor 77 and the row conductors 75.

The row conductors 72 are coupled to a row selector 78, the column conductors 73 are coupled to a column selector 79, the row conductors 75 to a row selector 80 and the column conductors 76 to a column selector 81. The selectors 78, 79, 80 and 81 are each coupled to a section 82, 83, 84, 85 of a fourgang mode selection switch having two positions labelled read No. 1 and read No. 2. The switch 82 is shown coupled to read No. 1 to a battery 86. The switch 83 is shown coupled to a read No. 1 position which is grounded. The switch 84 as shown is coupled to a battery 87 and the switch 85 is coupled to an open contact. In the read No. 2 position, the switch 82 is coupled to an open contact, the switch 83 is coupled to a battery 88, the switch 84 is coupled to ground and the switch 85 is coupled to a battery 89.

OPERATION

In the read No. 1 position, the column conductors 76 are coupled together to an open contact. Row conductors 75 are coupled together to the battery 87 applying the positive voltage to all of the row conductors 75. The column conductors 73 and row conductors 75 are transparent to permit the transmission of light signals to the photoconductor 77. Encoder 90 is coupled to the row and column selectors 78 and 79. Encoder 91 is coupled to the row and column selectors 80 and 81. The grounding of the column conductors 73 is controlled by column selector 79. The application of the positive voltage from the battery 86 to the row conductors 72 is controlled by the row selector 78.

When the switches 82–85 inclusive are in the read No. 1 position, encoder 90 is instructed to readin or readout. In the position shown, electroluminescent matrix No. 2 is disabled and matrix No. 1 is enabled. Here matrix No. 2 is shown in the readin position. Thus, row selector 80 is coupled to the switch 84 to the read No. 1 position and then to the readin-out mode selector switch 94 to the battery 87 to apply a positive voltage to each of the row conductors 75. In the readout condition, the switch 94 couples the row conductor 75 to an output mode impedance 95. The readin-out mode selector 93 is coupled to the read No. 2 position of the switch gang section 83. When the switch 83 is in the read No. 2 position the switch 93 controls readin or readout for the enabling of matrix No. 1.

Thus with matrix No. 1 enabled and the gang switches in the read No. 1 position, switch 94 determines readin or readout for the photoelectret. Conversely, when the gang switches are in the read No. 2 position, selector switch 93 determines readin or readout for the photoelectret as controlled by matrix No. 2.

DESCRIPTION AND EXPLANATION OF THE SCAN CONVERTER IN FIG. 5

Figure 5:
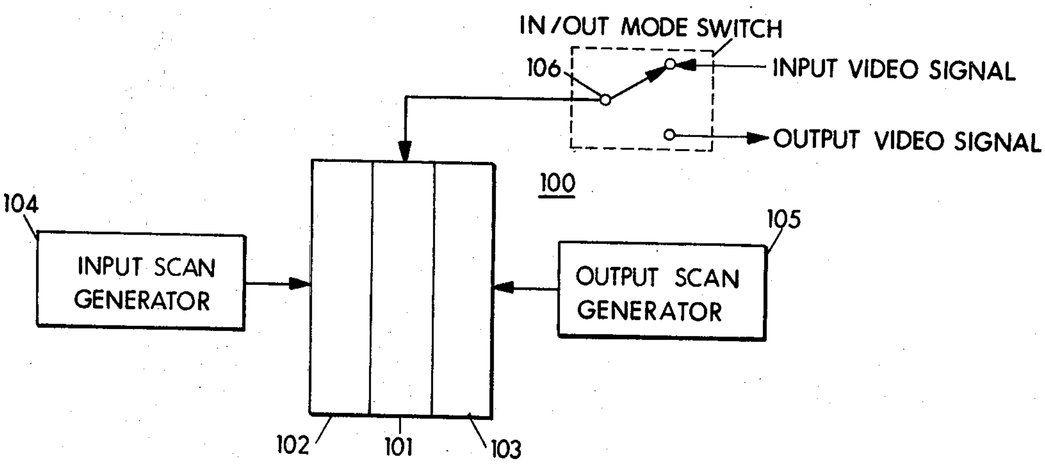
FIG. 5 is a schematic diagram of a scan converter embodying the invention.

Referring now to FIG. 5, there is here illustrated a scan converter system embodying the invention. A dual control electroluminescent diode photoelectret matrix is generally indicated at 100. A photoelectret 101 is sandwiched between an electroluminescent matrix 102 and an electroluminescent matrix 103. An input scan generator 104 is coupled to the matrix 102 and an output scan generator 105 is coupled to the matrix 103. Input video voltage signals are coupled to a switch 106 to the photoelectret 101. The switch 106 has two positions, one for input video signal and the other for an output video signal.

OPERATION

The input scan pattern and scanning rate are determined by the input scan generator 104 which programs the sequence in which the matrix elements in the input matrix 102 are pulsed to provide enabling light pulses for corresponding discrete photoelectret regions. The input video signal varies the electric field across the photoelectret in synchronization with the scanning signals. In this manner pictorial information may be recorded in the photoelectret in the form of a trapped electron charged pattern.

The output scan pattern and scanning rate are determined by the output scan generator 105 which controls the sequence of the illuminatiton of the matrix elements in the electroluminescent matrix 103. The output viedo signal is derived from the flow of current which results when the trapped electrons are released by the light pattern from the output matrix 103.

In this embodiment of the invention, the scan pattern or the scanning frequency or both may be converted by an appropriate choice of a program for the output scan generator 105.

DESCRIPTION AND EXPLANATION OF THE DISPLAY SYSTEM IN FIG. 6

Figure 6:
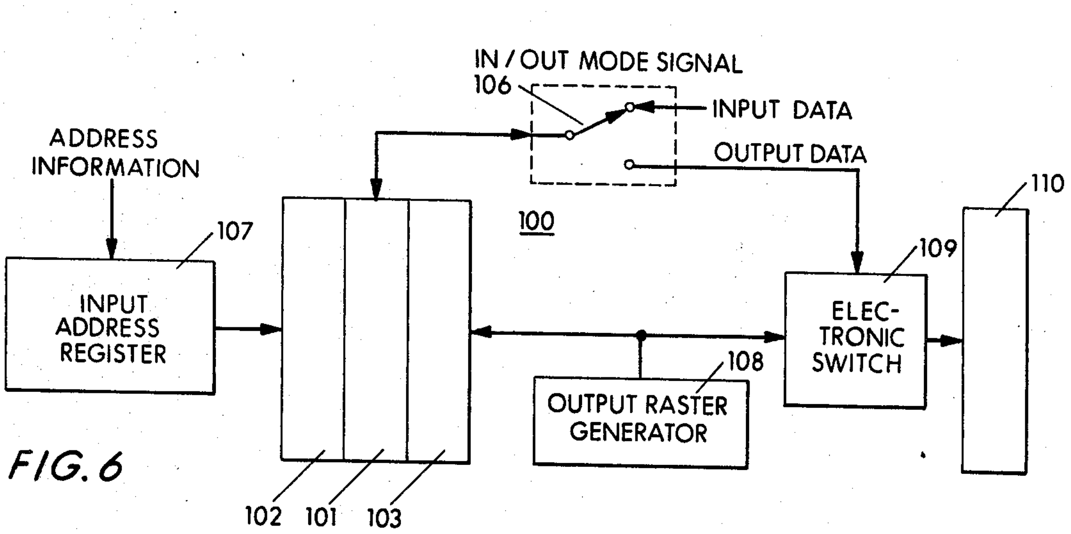
FIG. 6 is a schematic diagram of a flicker free display embodying the invention.

Referring now to FIG. 6, there is here illustrated a buffered flicker free display system embodying the invention. The system utilizes a dual control electroluminescent photoelectret matrix as illustrated in FIG. 5; hence, corresponding elements have the same reference numbers. Here again the dual control matrix is generally indicated at 100 and the photoelectret 101 is sandwiched between an input electroluminescent matrix 102 and an output electroluminescent matrix 103. An input address register 107 is coupled to the matrix 102. An output raster generator 108 is coupled to the matrix and to an electronic switch 109 which is coupled to a solid state display panel 110. The data switch 106 is coupled to the photoelectret 101 and is shown in the input data position. The other contact is coupled to the electronic switch 109. The non-destructive readout characteristic of the photoelectret of the invention enables a continuous readout for the purposes of a flicker free display of desired data. Such displays are used for example for stock quotations or travel information, arrival and departures and so forth. To be flicker free to the eye the data as displayed by the panel 110 must be periodically restored. The input data is applied to the photoelectret as determined by the input address register 107 which controls the application of the enabling light energy from the input matrix 102. The system operates in the readin mode to accept the input data. The output raster generator 108 controls the operation of both matrix 103 and the electronic switch 109. As the generator 108 enables a discrete photoelectret region by applying light from a selected matrix element, the electronic switch 109 is similarly controlled to provide the data at a corresponding discrete region of the solid state display panel 110. The panel 110 is addressed by the generator 108 and the output illuminated characters in the panel 110 are determined by the on-off control of the electronic switch in accordance with the output data derived from the photoelectret 101. The sampling interval for a given photoelectret region is maintained small to retain the non-destructive readout characteristic described above.

Data may be changed readily because of the random access possible at the input. A change in data is not perceptible to the human eye viewing the display panel 110 because of the very high speed with which the data may be changed in the photoelectret. Because of the random access to the storage data, the access time for updating the information is much faster than for serial buffers such as is characteristic of magnetic drums, disks, delay lines, and so forth. The displayed characters can be selectively change without the necessity for clearing the entire display panel. This feature is in sharp contrast to other types of solid state displays where the entire display must be cleared for example by disconnecting the power supply before any change can be made.

DESCRIPTION AND EXPLANATION OF THE FACSIMILE SYSTEM IN FIG. 7

Figure 7:
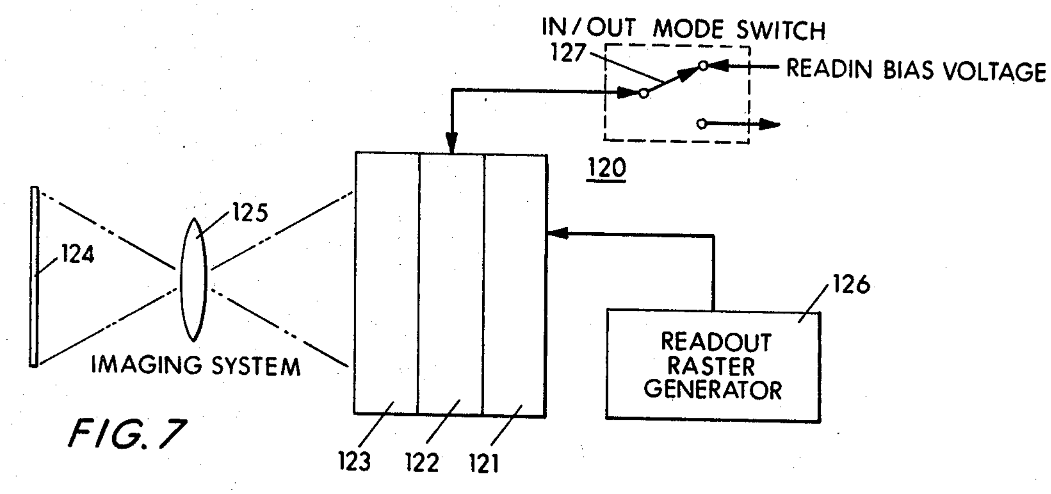
FIG. 7 is a schematic diagram of a facsimile transmission and band compression system embodying the invention.

Referring now to FIG. 7, there is here illustrated an image storing electroluminescent photoelectret matrix generally indicated at 120. Electroluminescent matrix 121 is integrally coupled to a photoelectret panel 122 having a transparent conductive layer 123. An image of an object 124 is projected through a projection lens system 125 through the conductor 123 to be stored in the photoelectret 122. A readout raster generator 126 is coupled to the readout electroluminescent matrix 121. A mode selector switch 127 is shown in the readin position for applying a bias voltage to the electret 122. In the output position the switch 127 couples an output video signal as determined by the generator 126 which programs the matrix 121 sequentially to energize the matrix elements.

OPERATION

The redundant fascimile transmission system shown operates in a manner similar to the vidicon camera system. An object to be photographed is imaged onto the photoelectret while the mode switch 127 is in the readin position. In the readout mode, the system operates to produce serial video signals as controlled by the generator 126 which periodically scans the electroluminescent matrix 121 to illuminate discrete photoelectret regions in a selected sequence. For facsimile transmission of information over noisy communication channels, for example, satellite telemetry systems, it is generally necessary to encode the video data by means of pulse code modulation techniques. The encoding operates to sample elements of stored information and encodes the signal amplitude of the sampled element into a binary code. The electroluminescent matrix is compatible with this type of sampling because the illuminated elements are fixed in storage space and the matrix may be driven in a step and repeat mode by the readout raster generator 126. The effective signal to noise ratio is improved by redundant transmission of the storage data by repetitive readout of the data.

BANDWIDTH COMPRESSION

By changing the generator 126 to a variable scan rate raster generator, a bandwidth compression system can be realized. The maximum transmission rate of information through a communication channel is determined by the bandwidth of the channel. The maximum scanning rate for facsimile transmission of black and white images is therefore limited by the response time of the communication channel to black/white or white/black transition. A variable scan rate generator system compresses the bandwidth required to transmit information at some average scanning rate by slowing down the scanning process in regions where transitions occur. Here a black and white image is stored in the photoelectret during the input cycle by means of an imaging system and appropriate biasing of the photoelectret. The data are readout by a special scanning pattern produced by the generator 126. Instead of energizing one element at a time in the matrix 121, a number of adjacent elements are energized simultaneously to form a line segment. The rate at which line segments are energized is set equal to the rate at which single elements are normally energized. Thus the effective element scanning rate is increased by a factor equal to the number of elements in a line segment.

So long as no information is contained in the storage elements illuminated by the line segments, the system operates at a very high scanning rate. As soon as one or more information containing elements are sensed, as indicated by a video output signal, the scan generator stops and repeats the energizing cycle for the previous line segment, one element at a time at the normal element sampling rate. In this system the facsimile receiver at the other end of the communication channel must also be capable of two speed operation. The switch over from high speed scanning to low speed scanning is provided on command from the facsimile transmitter by a signal sent through the communication channel. The video information to be recorded by the facsimile receiver is only received during the low speed scanning operation.

DESCRIPTION AND EXPLANATION OF THE MEMORY SYSTEM IN FIG. 8

Figure 8:
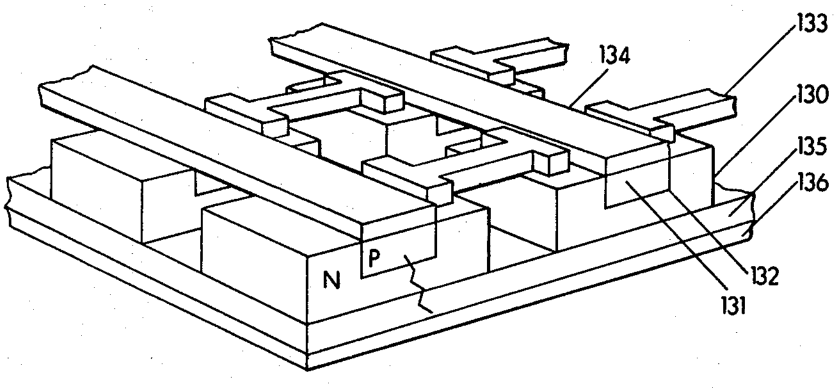
FIG. 8 is an isometric view of a modification of the memory system in FIG. 2.

Referring now to FIG. 8, there is here illustrated an electroluminescent diode protoelectret panel matrix. The matrix includes a layer of photoelectret material 135 sandwiched between a conductive layer 136 and a common conductive layer 130, of, for example, N-type semiconductor material disposed in the configuration shown.

Each conductor of the layer 130 has a P-type region 131 formed therein to provide a rectifying PN junction 132. The conductors of the layer 130 are interconnected by a plurality of I-shaped conductors 133. The P-type regions 131 are interconnected by a plurality of conductors 134. The matrix panel as shown is broken off to indicate an arbitrary number of cross over junctions between the transverse conductors. Thus the matrix shown may most broadly have *m* by *n* rows and columns of conductors. Here the conductive layer 130 electrically includes the conductors 133.

The panel may be formed by depositing a layer of conductive material 136 on a layer of photoelectret material 135. A layer of N-type material is deposited on the photoelectret layer 135. P-type impurity may be, for example, diffused into the N-type layer to provide PN junctions at selected discrete locations. The N-type layer 130 is then etched in a selected pattern effectively to provide distinct islands as shown. An uniform layer of conductive material may then be deposited covering the P and N exposed surfaces. The uniform layer is then etched to provide the conductors 133 interconnecting the N-type material and the conductors 134 interconnecting the P-type material.

While the various layers as illustrated in all of the figures appear to have substantial thickness, in practice these layers may be as thin as ten microns or less.

From the above description, it is apparent that the data bearing medium and apparatus of the present invention has broad application to the field of data storage and processing.

While there has hereinbefore been described what is at present considered to be the preferred embodiment of the invention, it will be apparent to those of ordinary skill in the art that many changes and modifications may be made thereto without departing from the true spirit and scope of the invention. It is to be considered therefore, that all those changes and modifications which fall fairly within the scope of the invention will be a part of the invention.

What is claimed is:

1. An electroluminescent diode photoelectret panel matrix memory device, comprising in combination:

(a) an electroluminescent diode panel matrix having a plurality of row and column conductors, said conductors being transversely positioned with respect to each other to form cross-overs, which upon activation by electrical signals, cause the electroluminescent diode panel matrix to emit discrete light signals at the activated cross-overs;

(b) means for providing electrical signals to said cross-overs;

(c) memory means for receiving and storing a signal in response to radiant energy applied thereto while a field is applied thereacross, said memory means retaining said signal when said radiation and said field are removed and discharging a signal when radiation is reapplied after a time interval, said memory means being positioned to receive said discrete light signals from said electroluminescent diode panel matrix;

(d) means for applying a field across said memory means; and (e) means for reading said signal out of said memory means when radiation is reapplied thereto.

2. A device of claim 1 wherein said memory means comprises a photoelectret panel having photoelectret regions which correspond with said cross-overs so that emitted discrete light signals from said cross-overs strike said photoelectret regions and said field applied thereacross is an electric field.

3. A device of claim 2 wherein said electroluminescent diode panel matrix and said photoelectret panel have a common pellucid conductive layer separating them.

4. A device of claim 3 wherein said photoelectret panel and said electroluminescent panel are sandwiched between two pellucid conductive layers.

5. A device of claim 4 including lens means for focusing an optical image upon said photoelectret panel.

6. A device of claim 4 containing an opaque mask interposed between said electroluminescent diode panel matrix and said photoelectret panel, said mask having pellucid areas corresponding with said cross-overs.

7. A data bearing medium, comprising in combination:

(a) a photoelectret for receiving and storing information in response to radiant energy applied thereto while an electric field is applied thereacross, said photoelectret exhibiting persistent internal polarization so that said information is retained in the form of an internal polarization after said radiation and said electric field are removed, and a signal representative of the stored information is discharged when radiation is reapplied after a time interval;

(b) two pellucid conductive layers, said photoelectret being positioned between said pellucid conductive layers;

(c) radiant energy means on at least one side of said photoelectret for irradiating said photoelectret, said radiant energy means comprising an electroluminescent diode panel matrix;

(d) means for applying an electric field across said photoelectret; and (e) means for reading said signal out of said photoelectret when radiation is reapplied thereto.

8. A data bearing medium of claim 7 including a second radiant energy means disposed on the opposite of said photoelectret from said first radiant energy means.

9. A data bearing medium of claim 8 wherein said second radiant energy means comprises an electroluminescent matrix.

10. A data bearing medium of claim 9 wherein said second radiant energy means comprises an electroluminescent diode panel matrix.

11. An information storage and retrieval apparatus, comprising in combination:

(a) memory means for receiving and storing information in response to read-in radiation applied thereto while an electric field is applied thereacross, said memory means retaining said information when said read-in radiation and said electric field are removed, and said memory means discharging a signal reppresentative of the stored information in response to read-out radiation applied to said memory means after a time interval;

(b) a first pellucid conductive electrode positioned on one side of said memory means;

(c) a second pellucid conductive electrode positioned on the opposite side of said memory means from said first pellucid conductive electrode;

(d) means for applying an electric field across said memory means;

(e) read-in means including a lens system for projecting read-in radiation images through said first pellucid conductive electrode and onto said memory means, said read-in means being located on the same side of said memory means as said first pellucid conductive electrode;

(f) addressing means located on the same side of said memory means as said second pellucid conductive electrode for projecting read-out radiation through said second pellucid conductive electrode and onto said memory means so that said addressing means does not interfere with the reading in of information into said memory means; and (g) means for reading out the signal discharged from said memory means upon the application of read-out radiation.

12. An information storage and retrieval apparatus of claim 11 wherein said memory means comprises a photoelectret which exhibits persistent internal polarization.

13. An information storage and retrieval apparatus of claim 12 wherein said addressing means provides discrete radiant energy.

14. An information storage and retrieval apparatus of claim 13 wherein said addressing means comprises an electroluminescent matrix.

15. An information storage and retrieval apparatus of claim 14 wherein said electroluminescent matrix comprises an electroluminescent diode panel matrix.

References Cited

UNITED STATES PATENTS

| | | | |
|---|---|---|---|
| 2,912,592 | 11/1959 | Mayer | 340—173 X |
| 3,059,115 | 10/1962 | Lempicki | 313—108 X |
| 3,066,242 | 11/1962 | Boyd | 340—166 X |
| 3,145,368 | 8/1964 | Hoover | 340—173 |
| 3,235,850 | 2/1966 | Kallmann et al. | 340—173 |
| 3,263,120 | 7/1966 | Aiken | 340—166 X |
| 3,268,331 | 8/1966 | Harper | 340—173 X |
| 3,309,553 | 3/1967 | Kroemer | 313—108 |
| 3,341,826 | 9/1967 | Lee | 340—173 |
| 3,199,086 | 8/1965 | Kallmann et al. | 340—173 |
| 3,440,620 | 4/1969 | French | 340—173 |
| 3,407,394 | 10/1968 | Hartke | 340—173 |

BERNARD KONICK, Primary Examiner

J. F. BREIMAYER, Assistant Examiner

U.S. Cl. XR.

340—166